I. Gray
Manufacture of Bungs.
No. 39644. Patented Aug. 25, 1863.

Witnesses:
J. W. Ells
Matthew Smith

Inventor:
Lyman Gray

UNITED STATES PATENT OFFICE.

LYMAN GRAY, OF PITTSBURG, PENNSYLVANIA.

IMPROVEMENT IN THE MANUFACTURE OF BUNGS.

Specification forming part of Letters Patent No. 39,644, dated August 25, 1863.

*To all whom it may concern:*

Be it known that I, LYMAN GRAY, of Pittsburg, in the county of Allegheny and State of Pennsylvania, have invented a new and useful Improvement in the Manufacture of Bungs; and I hereby declare that the following is a full, clear, and exact description thereof, reference being had to the accompanying drawings, which form part of this specification, and to the letters of reference marked thereon, in which—

Figure 1:
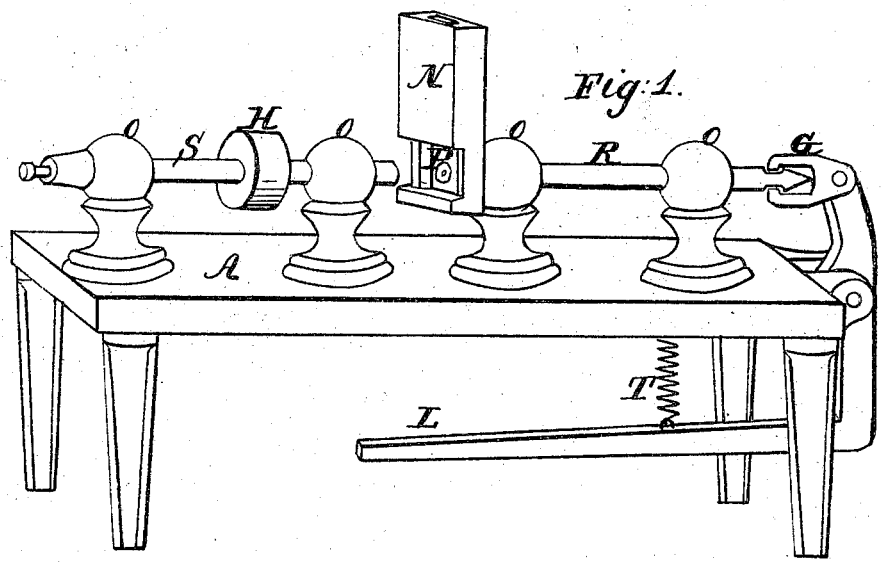
Figure 2:
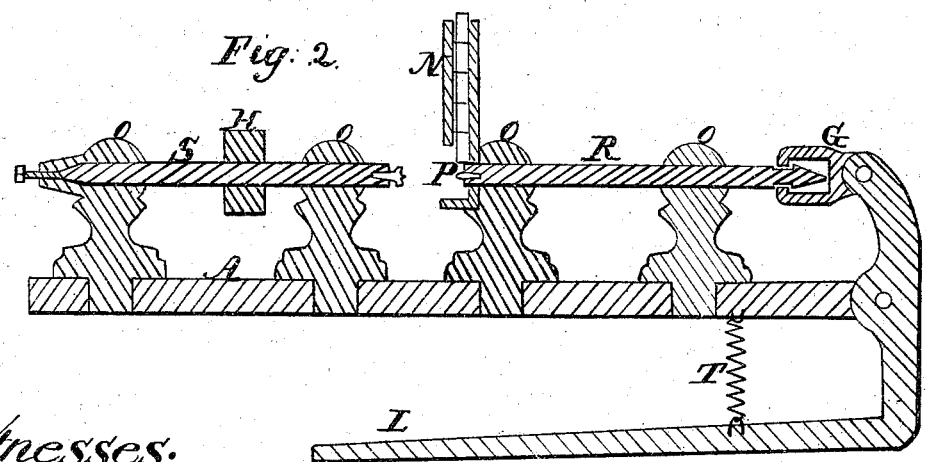

Figure 1 represents a perspective view of my bung-making machine. Fig. 2 represents a longitudinal vertical section of the same.

All the drawings are lettered, and similar letters indicate like parts on the different figures.

The object of my invention is to turn bungs (such as are used for stopping the holes in barrels) from small square blocks sawed from boards of the proper thickness, whereby I am enabled to produce them with greater rapidity and less waste of "stuff" than by any other method yet devised for the same purpose. To accomplish this, I have constructed my machine very similar to an ordinary turning-lathe, having a table or stand, A, upon which is erected suitable heads, o o o o, for carrying the spindles S and R, one of which is revolved with great rapidity by means of the pulley H near its center. The other spindle, R, has a longitudinal motion back and forth, the object of which will be hereinafter explained. Upon the head carrying the forward end of this spindle I have constructed a vertical guide-box, N, with an opening, P, (of the size of one block,) at the bottom of the front side.

The operation of my machine is as follows: The blocks being cut to the proper size and thickness, by means of circular or other saws, they are then placed on their edges, one above the other, in the guide-box N, the lower block resting during the turning of the one immediately preceding it upon the end of the spindle R. When one block is turned, by raising the foot from the long lever L the spindle is thrown back by a spring, T, which allows the lowermost block to drop down opposite the opening P in the guide-box N, when by pressing down the lever L the block is thrown suddenly forward against the live-spindle S and caught by a suitable device placed there to hold it, the sliding spindle assisting therein, the turning being effected by hand-tools or any other way deemed the most expedient. On rapid motion being given to the block forced out against the live-spindle S, the friction causes the sliding spindle R to turn also, due allowance having been made for that purpose by inclosing the small or rear end in an anti-friction clutch, G, which device gives the spindle a center bearing, whereby it starts off the moment the block comes in contact with the chuck on the live spindle. The opening P in the guide-box N, being of the exact size of the blocks, insures their being caught properly by the chuck in the end of the revolving spindle S on their exit from said box. By this arrangement I am enabled to center and turn more bungs faster and better, in the same length of time, than by any other machine for the purpose heretofore invented.

Having thus briefly described my improved mode of manufacturing bungs, what I claim is—

1. The method of centering and turning bungs out of small blocks of wood, in the manner as herein set forth.

2. The guide-box N, with its opening P, in combination with the spindle R, for the purpose hereinbefore stated.

3. The lever L, combined with the sliding spindle R, by means of the clutch G, in the manner as herein shown and set forth.

LYMAN GRAY.

Witnesses:
J. W. ELLS,
MATTHEW SMITH.